(12) United States Patent
Beiler et al.

(10) Patent No.: US 12,208,845 B2
(45) Date of Patent: Jan. 28, 2025

(54) SELF-PROPELLED TANDEM AXLE TRAILER

(71) Applicant: New Heights, LLC, Leola, PA (US)

(72) Inventors: Aaron Jay Beiler, Gap, PA (US); William Fisher, Paradise, PA (US); Raymond Beiler, New Holland, PA (US); Jeremiah Weaver, Narvon, PA (US)

(73) Assignee: New Heights, LLC, Leola, PA (US)

( * ) Notice: Subject to any disclaimer, the term of this patent is extended or adjusted under 35 U.S.C. 154(b) by 0 days.

(21) Appl. No.: 18/151,125

(22) Filed: Jan. 6, 2023

(65) Prior Publication Data

US 2023/0146902 A1 May 11, 2023

Related U.S. Application Data

(63) Continuation of application No. 16/599,820, filed on Oct. 11, 2019, now Pat. No. 11,597,457.

(60) Provisional application No. 62/744,901, filed on Oct. 12, 2018.

(51) Int. Cl.
*B62D 59/04* (2006.01)
*B60K 17/10* (2006.01)
*B60P 1/02* (2006.01)
*B62D 13/00* (2006.01)
(Continued)

(52) U.S. Cl.
CPC ............. *B62D 59/04* (2013.01); *B60K 17/10* (2013.01); *B60P 1/02* (2013.01); *B62D 13/00* (2013.01); *B62D 63/06* (2013.01); *B66F 9/0655* (2013.01)

(58) Field of Classification Search
CPC ........ B62D 59/04; B62D 13/00; B62D 63/06; B62D 13/04; B60K 17/10; B60K 17/14; B60K 17/145; B60K 17/354; B60K 17/356; B60K 17/358; B60K 2007/0061; B60K 2007/0092; B60K 7/0007; B60K 7/0015; B60K 7/0023; B60P 1/02; B66F 9/0655; B60Y 2200/147; B60Y 2200/49
See application file for complete search history.

(56) References Cited

U.S. PATENT DOCUMENTS

| | | | |
|---|---|---|---|
| 2,391,948 | A | 1/1946 | Couse |
| 2,427,132 | A | 9/1947 | Godbey |
| 4,135,456 | A | 1/1979 | Welsh |

(Continued)

FOREIGN PATENT DOCUMENTS

| | | |
|---|---|---|
| EP | 3354506 A2 | 8/2018 |
| EP | 3381773 A1 | 10/2018 |

OTHER PUBLICATIONS

International Preliminary Report on Patentability and Written Opinion dated Mar. 30, 2023, corresponding to Application No. PCT/US2021/050904, 8 pages.

*Primary Examiner* — Kevin Hurley
*Assistant Examiner* — Marlon A Arce
(74) *Attorney, Agent, or Firm* — Barley Snyder

(57) ABSTRACT

A trailer for towing a power vehicle is provided and generally includes a frame and a self propelled tandem wheel assembly. The frame includes an undercarriage chassis, and the self propelled tandem wheel assembly is positioned under the undercarriage chassis. The self propelled tandem wheel assembly includes a rear wheel assembly and a front wheel assembly, and the rear wheel assembly and the front wheel assembly are equally positioned to support the undercarriage chassis.

14 Claims, 8 Drawing Sheets

(51) Int. Cl.
 *B62D 63/06* (2006.01)
 *B66F 9/065* (2006.01)

(56) References Cited

U.S. PATENT DOCUMENTS

| | | | | |
|---|---|---|---|---|
| 5,332,052 | A | * | 7/1994 | Carnevale ................ B60K 5/10 |
| | | | | 180/209 |
| 5,421,613 | A | * | 6/1995 | Allison ................ B62D 53/061 |
| | | | | 280/789 |
| 6,422,369 | B1 | | 7/2002 | McCalla |
| 7,222,867 | B2 | * | 5/2007 | Rotz ...................... B62D 61/12 |
| | | | | 180/209 |
| 7,913,782 | B1 | | 3/2011 | Foss et al. |
| 9,776,677 | B2 | | 10/2017 | Yakimishyn |
| 10,300,970 | B2 | | 5/2019 | Beiler |
| 10,464,463 | B2 | | 11/2019 | Beiler et al. |
| 10,532,688 | B2 | | 1/2020 | Richards et al. |
| 10,632,891 | B2 | | 4/2020 | Derstine |
| 10,906,566 | B2 | | 2/2021 | Dede et al. |
| 11,117,629 | B1 | | 9/2021 | Wessels |
| 11,131,095 | B2 | | 9/2021 | Beiler et al. |
| 11,197,422 | B2 | | 12/2021 | Kuriyagawa et al. |
| 11,420,695 | B2 | * | 8/2022 | Viele .................... B62D 53/005 |
| 2004/0050596 | A1 | * | 3/2004 | Shimizu ................ B62D 7/144 |
| | | | | 180/24.01 |
| 2005/0051994 | A1 | | 3/2005 | Rodgers |
| 2008/0211289 | A1 | | 9/2008 | Beiler et al. |
| 2010/0301584 | A1 | | 12/2010 | Pipe et al. |
| 2015/0210326 | A1 | | 7/2015 | Sponselee |
| 2020/0114933 | A1 | | 4/2020 | Ono et al. |

\* cited by examiner

SELF-PROPELLED TANDEM AXLE TRAILER

CROSS-REFERENCE TO RELATED APPLICATION

This application claims the benefit of the filing date of U.S. patent application Ser. No. 16/599,820 filed on Oct. 11, 2019, which claims priority to U.S. Provisional Patent Application No. 62/744,901, filed on Oct. 12, 2018

FIELD OF THE INVENTION

The invention relates to a self-propelled tandem axle trailer and, more particularly, to a self-propelled tandem axle trailer having a rear extending storage bin and a movable front axle.

BACKGROUND

Workers often find that providing materials for replacement of a building roof is very time consuming, considering the task involves using different mechanical units or manual labor to lift building materials from a truck and position them on a roof. Furthermore, stripping old material from the building roof in order to put on a new roof is also time consuming and a dirty job. Generally, old material is thrown from the roof to the ground around the building and then workers manually pick up debris to deposit it into a disposal container. Even if the material can be thrown directly into a container there remain the problems of getting the disposal container in proximity to the roof and removal from the work site. The most common solution to the disposal problem is to move a dump truck adjacent to the building and to attempt to throw the material directly from the roof into the truck bin. Furthermore, the problem is not limited to roofing material. Any building remodeling generates significant construction trash, and the most convenient method of removing it from the building is to throw it out a window.

As a result, it is not always possible to move a large truck into a location adjacent to a building. Fences, lawns, and shrubs can be damaged by any size truck, especially a large transport truck.

There is a need for a vehicle that can move around the typical landscaped yard surrounding a building and position a storage bin into an extended position near workers and that is study enough to handle large loads.

SUMMARY

In view of the foregoing, a trailer for towing by a power vehicle is provided and generally includes a frame and a self propelled tandem wheel assembly. The frame includes an undercarriage chassis, and the self propelled tandem wheel assembly is positioned under the undercarriage chassis. The self propelled tandem wheel assembly includes a rear wheel assembly and a front wheel assembly, and the rear wheel assembly and the front wheel assembly are equally positioned to support the undercarriage chassis.

BRIEF DESCRIPTION OF THE DRAWINGS

The invention is explained in greater detail below with reference to embodiments and the appended drawings of which.

DETAILED DESCRIPTION OF THE EMBODIMENT(S)

Figure 1:
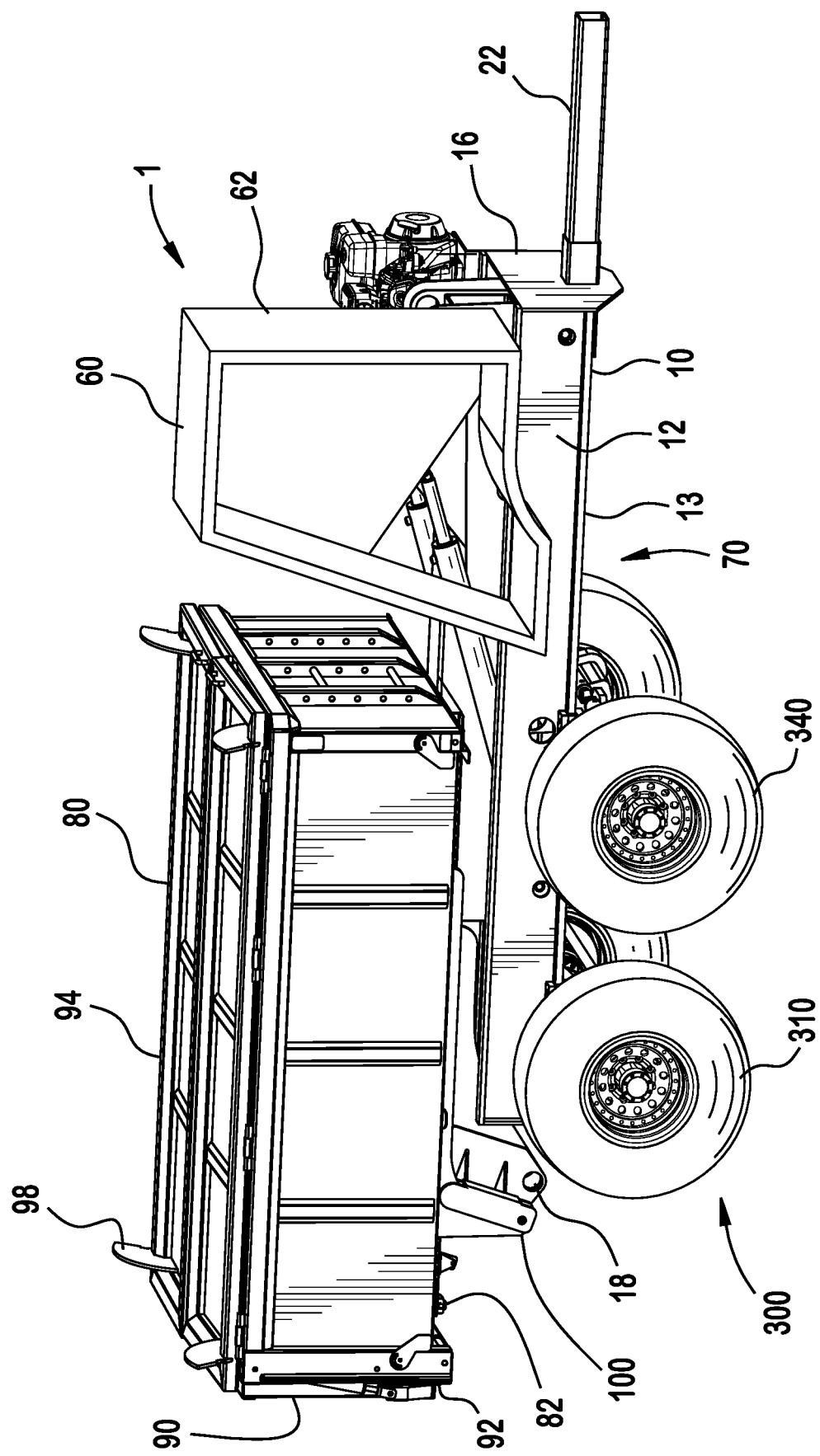
FIG. 1 is a front perspective view of a self-propelled tandem axle trailer according to the invention.

With respect to FIGS. 1-6, a trailer 1 according to the invention is shown and ready for towing by a power vehicle, such as a truck with a tow hitch. The trailer 1 generally includes the following major components: a frame 10, a control system 60, a storage bin 80, and an extension device 100, and a tandem wheel assembly 300.

Now with reference to FIGS. 1-4, the frame 10 will be discussed. In the shown embodiment, the frame 10 includes a plurality of support beams 12, a plurality of connecting beams 14, a front support 16, a rear support 18, a trailer connection section 22, and.

Figure 2:
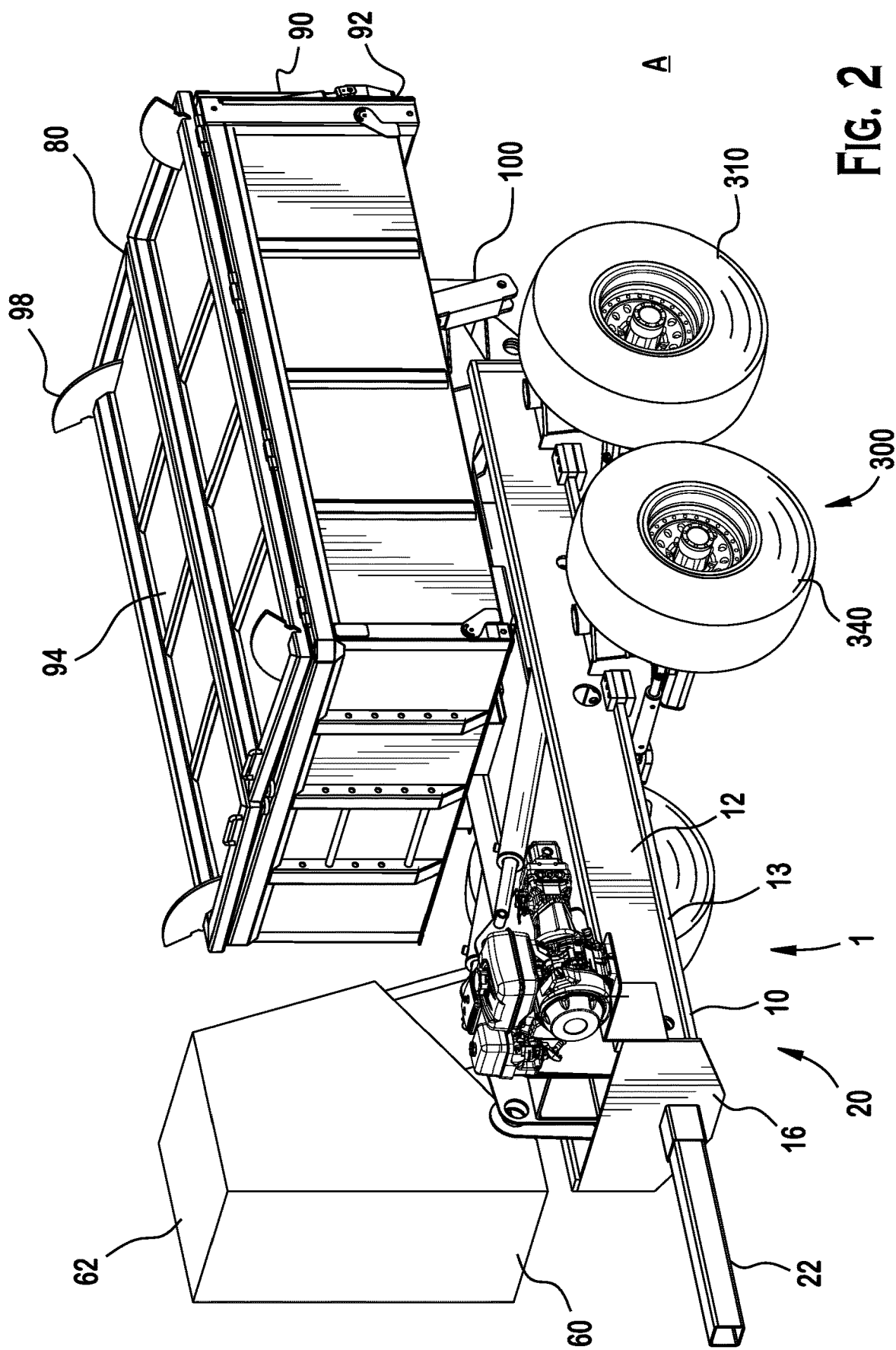
FIG. 2 is rear perspective view of the self-propelled tandem axle trailer of FIG. 1.
Figure 3:
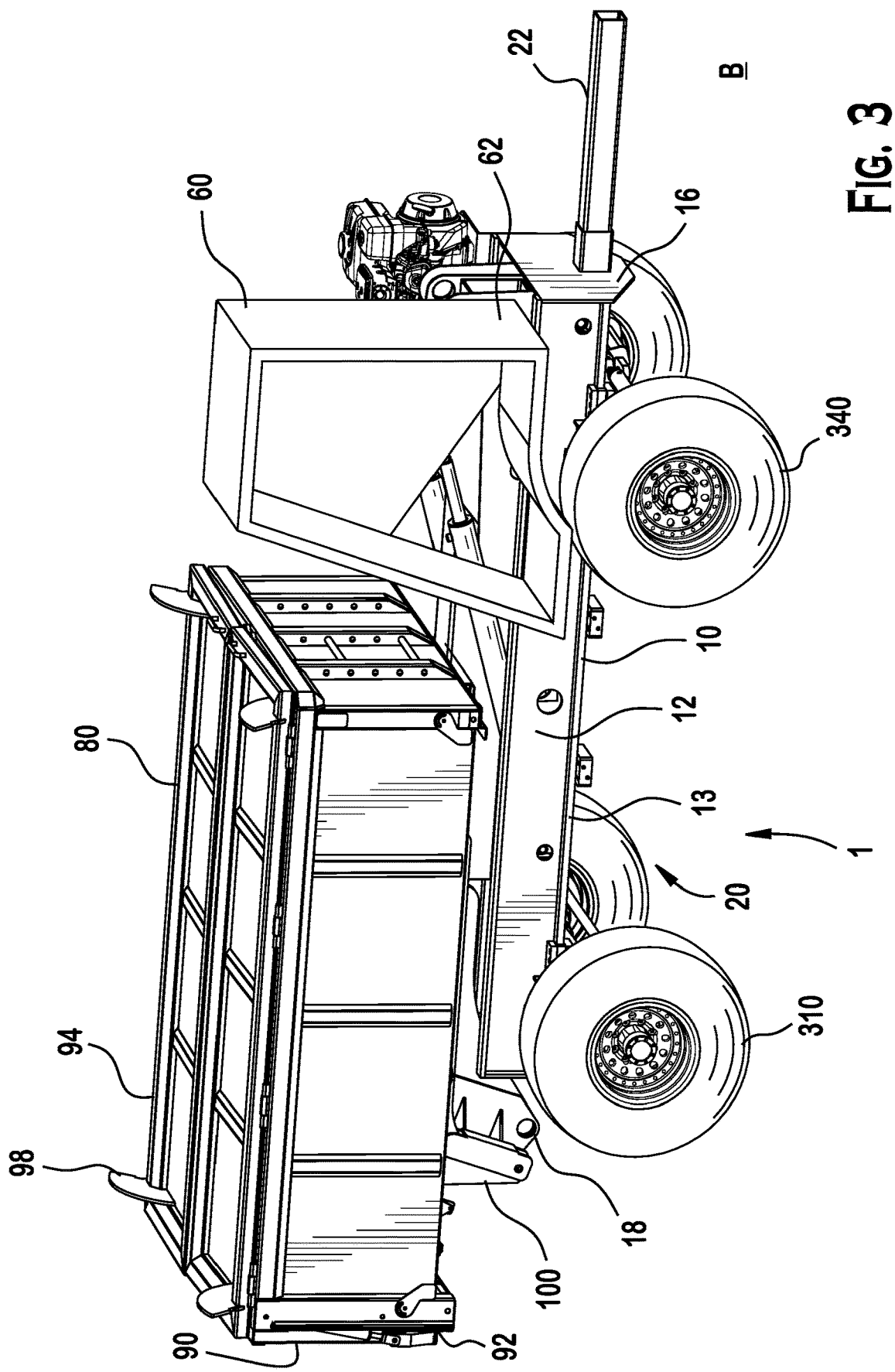
FIG. 3 is perspective view of a self-propelled tandem axle trailer according to the invention, showing extension of a front axle to a drivable position.
Figure 4:
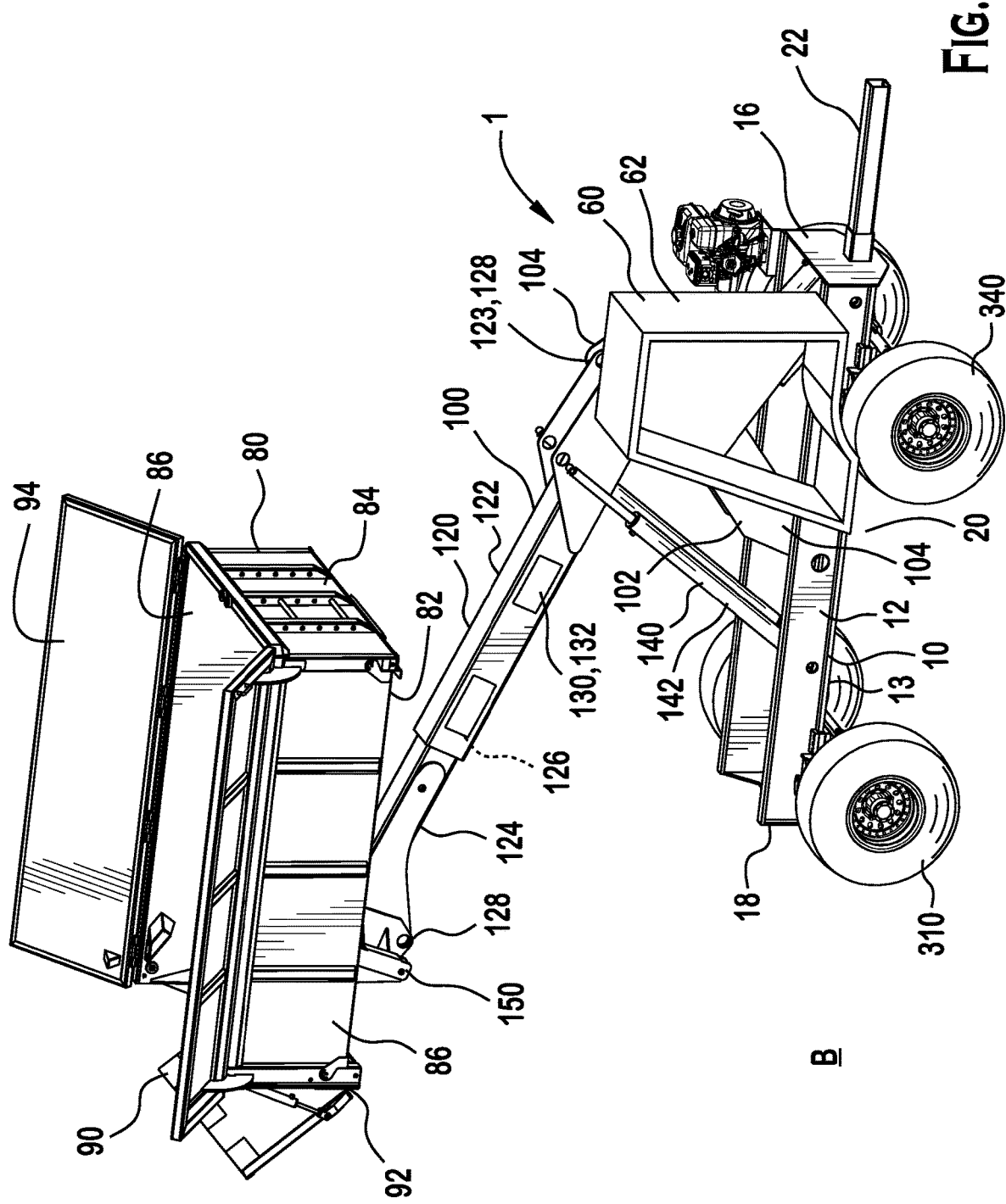
FIG. 4 is another perspective view of the trailer of FIG. 3, showing extension and inclination of a storage bin thereof.
Figure 5:
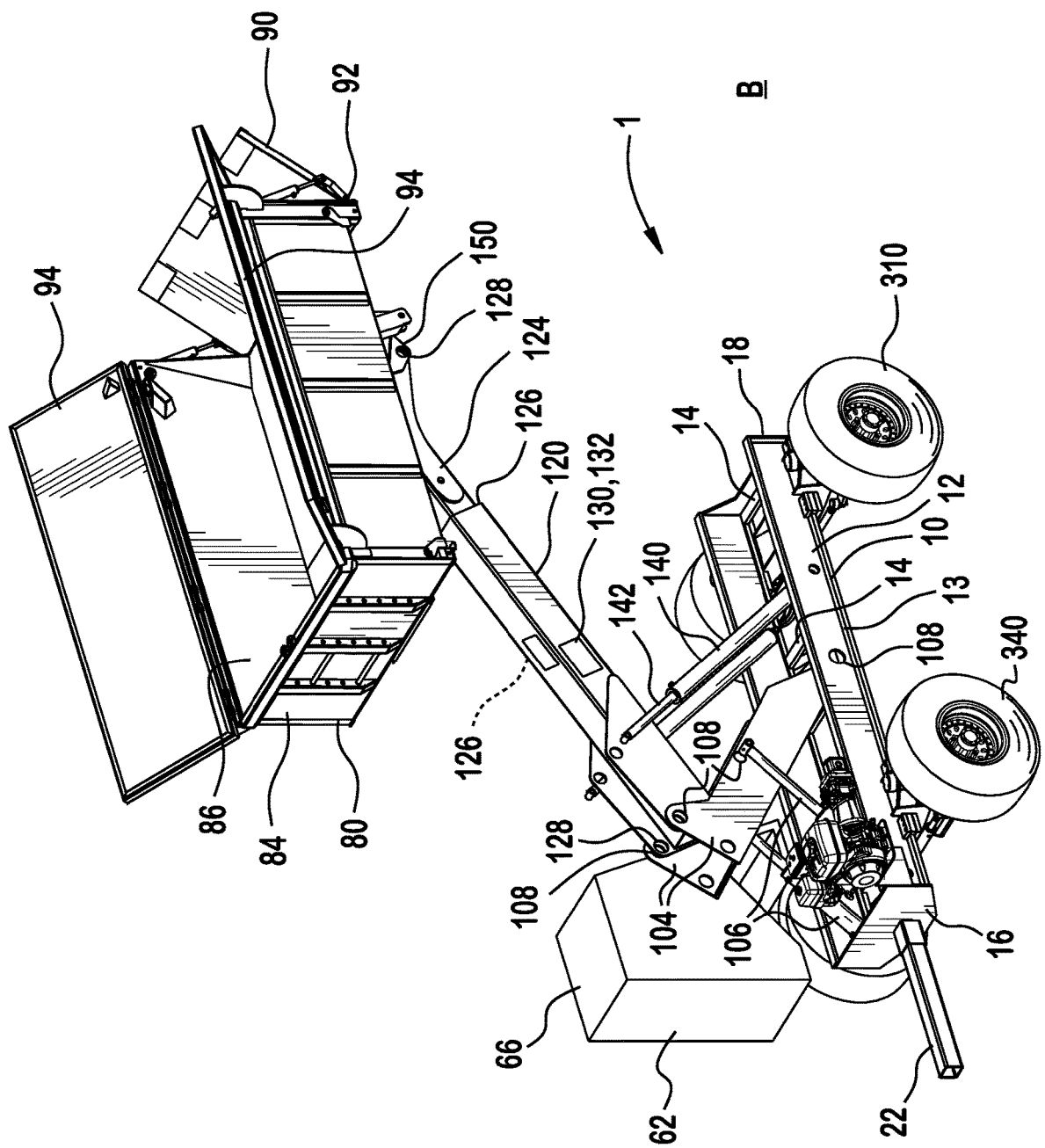
FIG. 5 is a front perspective view of the trailer of FIG. 3, showing further extension and inclination of the storage bin.
Figure 6:
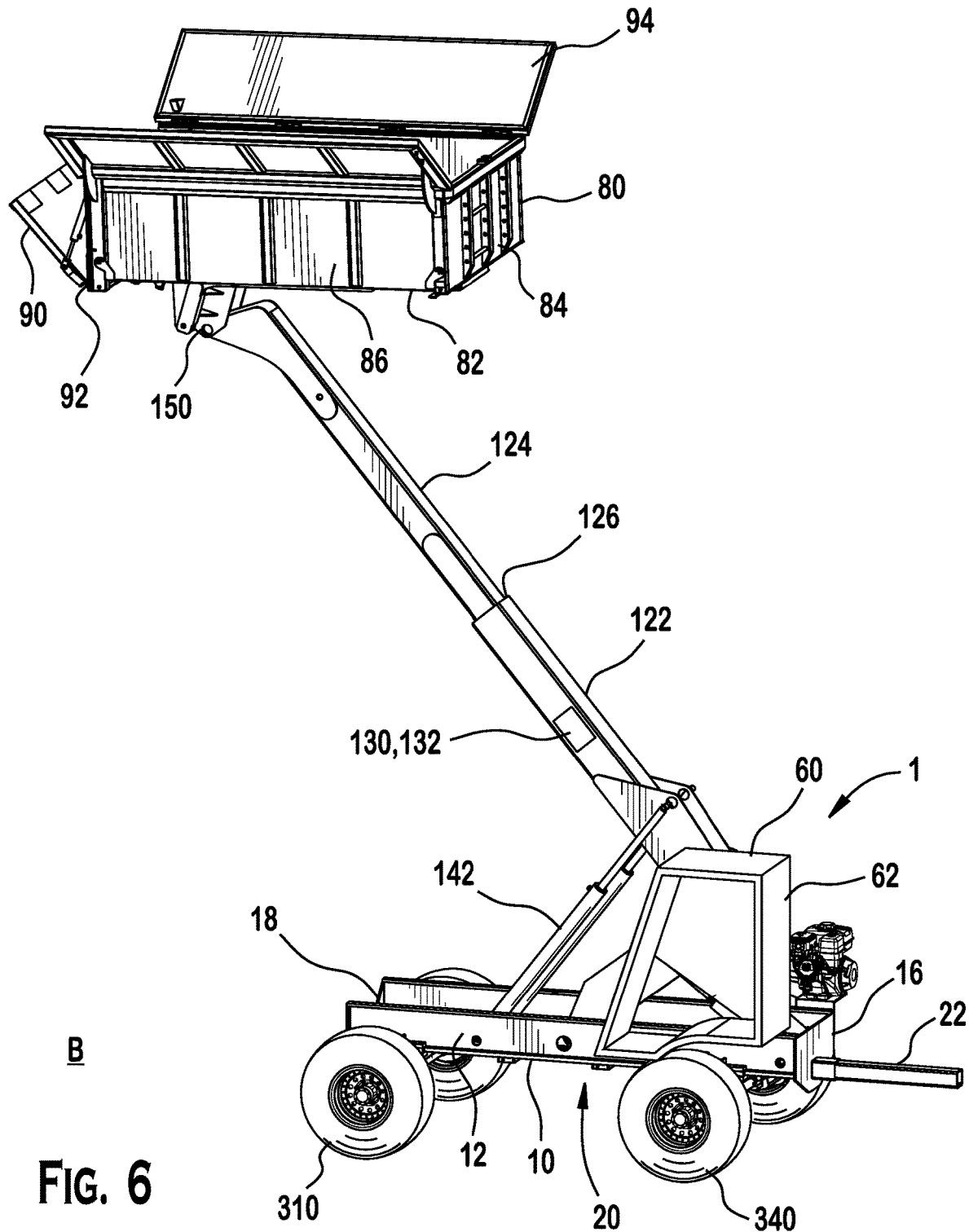
FIG. 6 is a rear perspective view of the trailer of FIG. 5.

As shown in FIGS. 2 and 3, each support beam 12 is an elongated metal support extending along a length of the frame 10, from a trailing end to a leading end thereof.

In the embodiment shown, each support beam 12 is I-shaped and includes a support rail 13 positioned on a lower end and running along a length thereof.

Each connection beam 14 runs substantially perpendicular and connecting to the plurality of support beams 12. The front support 16 is a plate like member connecting the support beams 12 at a front end thereof, while the rear support is another plat like member connecting the support beams 12 at an opposite end thereof . . . . As assembled, the support beams 12, connection beams 14, front support 16, and rear support form a undercarriage chassis 20

As shown, in an exemplary embodiment of the invention, the trailer connection section 22 is a trailer hitch 22 positioned and connected to a leading end of the frame 10, and, in particular, the front support 16. The trailer hitch 22 includes a connector for connecting with a truck (i.e. ball mount; not shown).

According to the invention, the trailer 1 includes a tandem wheel assembly 300. In an exemplary embodiment of the invention, the tandem wheel assembly 300 is positioned under the undercarriage chassis 20 and generally includes a rear wheel assembly 310, a front wheel assembly 340, and an extension assembly 380.

Figure 8:
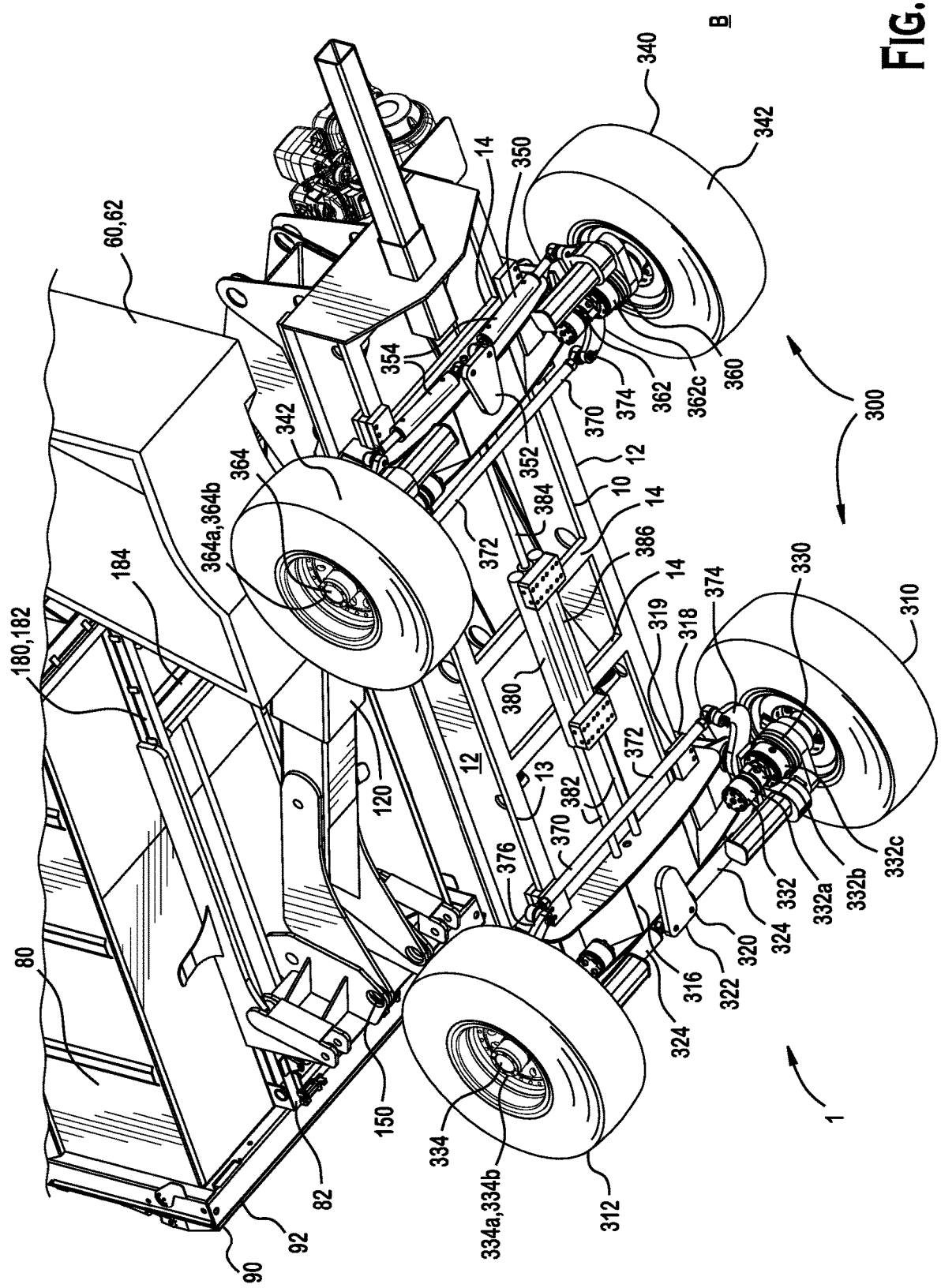
FIG. 8 is a bottom perspective view of the self-propelled tandem axle trailer according to the invention.

As shown in FIGS. 8, the rear wheel assembly 310 includes a pair of rear wheels 312, a rear wheel frame 314, a rear steering assembly 320, and a rear drive assembly 330.

In the embodiment shown, the rear wheel frame 314 includes a rear guide member 315 member having a body 316 and a pair of low friction guides 318 positioned at opposite side ends thereof. Each low friction guide 318 is a u-shaped member secured to the rear wheel frame 314 and is sized and shaped to correspond to receive the support rail 13. The low friction guide 318 includes low frictions pads 319 are bearing pads known in the art to provide a low friction coefficient between the rear wheel frame 314 and the support rail 13. In the shown embodiment, the low friction pads 319 line an inside surface of the low friction guide 318. In this manner, the rear wheel assembly is movably secured to the frame in a manner that allows the wheel assembly to slide upon the frame support rails, and be alternately positioned in a first position for trailering, and a second position for self-propelled movement, as depicted in FIG. 8, or any point in between. As can be seen in the exemplary embodiment of FIG. 8, the rear wheel assembly 314 is provided with u-shaped members slidably mounted on separate, parallel support rails 13 on the frame 10, and are positioned such that the u-shaped members prevent twisting movement of the front wheel assembly, relative to the frame, as the spacing provided between the inside dimensions of the opposing u-shaped members is substantially the same, or nearly the same, as the maximum width dimension of the support rails 13.

In the embodiment shown, the rear wheel assembly 310 includes steering capability using a rear steering assembly 320 according to the invention. However, one skilled in the art should appreciate that these rear wheels 312 may be non-steerable. As shown, the rear steering assembly includes a steering bracket 322, a pair of steering arms 324 connected to the steering bracket 322 and the pair of rear wheels 312.

As shown in FIG. 8, in an exemplary embodiment of the invention, the rear wheel assembly 310 includes a rear drive assembly 330 according to the invention. In an exemplary embodiment of the invention, the rear drive assembly 330 includes a hydraulic motor assembly 332 and a rotor assembly 334, and an engagement assembly 370 for each rear wheel 312.

In an embodiment of the invention, the hydraulic motor assembly 332 generally includes a motor 332a, a motor drive mechanism 332b, and a motor housing 332c. The motor 332a is connected to the control system 60 using hydraulic lines (not shown). The motor 332a is attached to the outside of the motor housing 332c. The motor drive mechanism 332b positioned in a motor housing 332c is engageable with the hydraulic motor 332a and moveable by the engagement assembly 370.

In an embodiment of the invention, the rotor assembly 334 includes a wheel hub 334a and a drive shaft 334b with a rotor drive mechanism (not shown) engageable with the motor drive mechanism 332b by the engagement assembly 370. The drive shaft 334b connected to the wheel hub 334a.

Many of the power system components are not shown for sake of complexity in the drawings, although a discussion is provided for purposes of enabling one skilled in the art to understand how the drive system is assembled and performed. One skilled in art should appreciate that other designs are possible. For instance, the rear drive assembly 330 may include other methods to move the rear wheels 312, including chains, belts, or a drive shaft and a transmission connected to a combustion or electric engine, so that trailer 1 can be moved around a work site under its own power.

Figure 7:
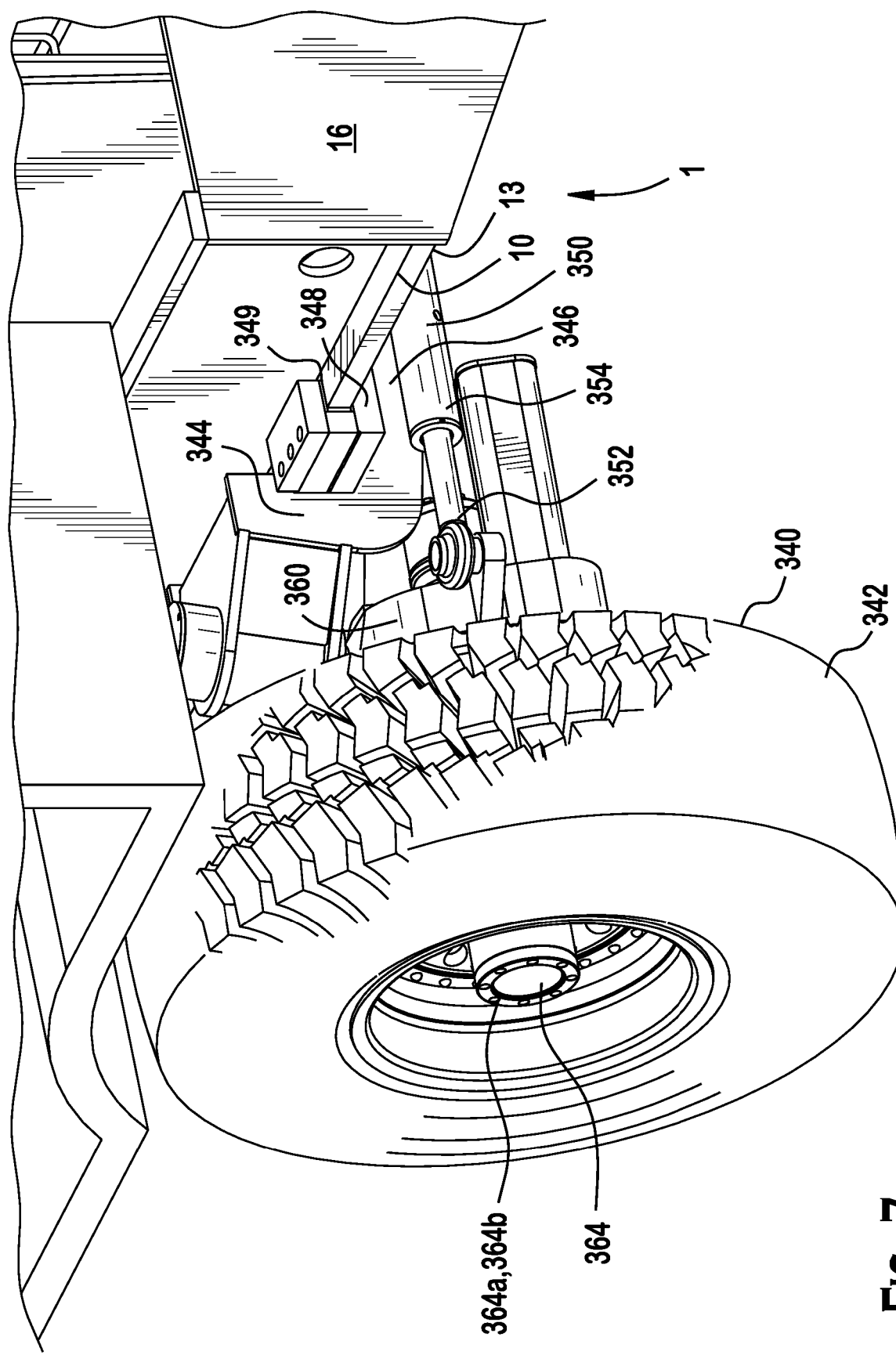
FIG. 7 is a close up view of a front wheel of the self-propelled tandem axle trailer according to the invention.

As shown in FIGS. 7 and 8, the front wheel assembly 340 includes a pair of front wheels 342, a front wheel frame 344, a front steering 350 assembly, and a front drive assembly 360.

In the embodiment shown, the front wheel frame 344 is u-shaped member having a body 346 and a pair of low friction guides 348 positioned at opposite side ends thereof. Each low friction guide 348 is a u-shaped member secured to the front wheel frame 344 and is sized and shaped to correspond to receive the support rail 13. The low friction guide 348 includes low frictions pads 349 that are bearing pads known in the art to provide a low friction coefficient between the front wheel frame 344 and the support rail 13. In the shown embodiment, the low friction pads 349 line an inside surface of the low friction guide 318. In this manner, the front wheel assembly is movably secured to the frame in a manner that allows the wheel assembly to slide upon the frame support rails, and be alternately positioned in a trailer position A (depicted in FIG. 1), and the self-propelled position B as depicted in FIG. 8, or any point in between. As can be seen in the exemplary embodiment of FIG. 8, the front wheel assembly 340 is provided with u-shaped members slidably mounted on separate, parallel support rails 13 on the frame 10, and are positioned such that the u-shaped members prevent twisting movement of the front wheel assembly, relative to the frame, as the spacing provided between the inside dimensions of the opposing u-shaped members is substantially the same, or nearly the same, as the maximum width dimension of the support rails 13.

In the embodiment shown, the front wheel assembly 340 includes steering capability using a front steering assembly 350 according to the invention. However, one skilled in the art should appreciate that these front wheels 342 may be non-steerable. As shown, the front steering assembly includes a steering bracket 352, a pair of steering arms 354 connected to the steering bracket 352 and the pair of front wheels 342.

As shown in FIG. 8, in an exemplary embodiment of the invention, the front wheel assembly 340 includes a front drive assembly 360 according to the invention. However, one skilled in the art should appreciate that this front wheels 342 may be non-driveable, without a drive system.

In an exemplary embodiment of the invention, the front drive assembly 360 generally includes a hydraulic motor assembly 362 and a rotor assembly 364, and an engagement assembly 370 for each front wheel 342.

In an embodiment of the invention, the motor assembly 362 generally includes a motor 362a, a motor drive mechanism 362b, and a motor housing 362c. The motor 362a is connected to the control system 60 using hydraulic lines (not shown). The motor 362a is attached to the outside of the motor housing 362c. The motor drive mechanism 362b positioned in a motor housing 362c is engageable with the hydraulic motor 362a and moveable by the engagement assembly 370.

In an embodiment of the invention, the rotor assembly 364 includes a wheel hub 364a and a drive shaft 364b with a rotor drive mechanism (not shown) engageable with the motor drive mechanism 362b by the engagement assembly 370. The drive shaft 364b connected to the wheel hub 364a.

Many of the power system components are not shown for sake of complexity in the drawings, although a discussion is provided for purposes of enabling one skilled in the art to understand how the drive system is assembled and performed. One skilled in art should appreciate that other designs are possible. For instance, the front drive assembly 360 may include other methods to move the front wheels 342, including chains, belts, or a drive shaft and a transmission connected to a combustion or electric engine, so that trailer 1 can be moved around a work site under its own power.

In the shown embodiment, the rear wheel assembly 310 and the front wheel assembly 340 includes an engagement assembly 370. As shown, each engagement assembly 370 generally includes a main shaft 372, a first lever assembly 374, and a second lever assembly 376. The main shaft 372 is an elongated cylindrical member and connected to the first lever assembly 374 and the second lever assembly 376 at opposite ends thereof. The first lever assembly 372 and the second lever assembly 376 are connected to opposite rear wheels 312 or front wheel 342, and engage and disengage the motor drive mechanism 332b, 362b, from the rotor drive mechanism (not shown) to rotate the wheel hub 334a, 364a.

In an exemplary embodiment of the invention, the extension assembly 380 generally includes a rear end connector 382, a moveable axle connector 384, and a moving component 386. The rear end connector 382 is connected to the rear wheel assembly 310, while the moveable axle connector 384 is connected to the front wheel assembly 340. The moving component 386 is a hydraulic actuator positioned and secure to the undercarriage chassis 20 in the shown embodiment. The moving component 386 is capable of extension and contraction. When connected to the front wheel assembly 340, the front wheels 342 can be positioned between the trailing position A (see FIGS. 1 and 2) and the self-propelled position B (see FIGS. 5-8).

Now with reference to the Figures, the control system 60 will be discussed and generally includes a power system source (i.e. combustion engine, battery) and a control assembly connected (hydraulic and electrical lines) to the rear wheel assembly 310, the front wheel assembly 340, and the extension assembly 380.

Regardless of the specific mode of powering the rear wheels 312, the control system 60 controls starting, stopping and turning the rear wheels 312, as well as for regulating the speed of the rear wheels 312. Likewise, the control system 60 also controls starting, stopping and turning the front wheels 342, as well as for regulating the speed of the front wheels 342.

The control system 60 includes a plurality of controls which may be a series of buttons, levers, or other suitable controls which allow the operator to control expansion and retraction of the front wheel assembly 340 using the extension assembly.

In an embodiment, user controls may be provided on the control system 60 for controlling certain other features of the trailer 1. As shown in the embodiment of FIG. 1, an operator stand may sit in operator's box 62, allowing an operator to move along with the trailer 1 as the operator controls the trailer 1 movement. The control system 60 therefore provides the operator with the ability to control all features of the trailer 1 from a single location, while standing on the operator stand and moving along with the trailer 1 as the trailer 1 travels under its own power.

In a trailing position A, the front wheels 342 are positioned adjacent to the rear wheels 312, while in the self-propelled position B the front wheels 342 are positioned to equally support the undercarriage chassis 20 and, more particularly, the storage bin 80.

According to the invention, the front wheels 342 are positioned between the trailing position A and the self-propelled position B by the extension assembly 380.

Now with reference to the embodiment depicted in FIGS. 1-4, the trailer has a storage bin 80, which generally includes a platform 82, a plurality of retaining walls 84, a tailgate 90, and a pair of cover sections 94.

The platform 82 includes a planar section extending substantially parallel with the frame 10. In the shown embodiment, the platform 82 is a rectangular metal plate. However, one skilled in the art should appreciate that the platform 82 could be manufactured using different shapes and other materials, such as lumber, composite, and other metals. For instance, the platform 82 may include a framed metal structure on which a plurality of wood planks are arranged.

The plurality of retaining walls 84 includes a pair of side retaining walls 86 and a retaining end wall 88. In the shown embodiment, each retaining wall 84 is metal plate. However, one skilled in the art should appreciate that each retaining wall 84 could be manufactured using other materials, such as lumber, composite, and other metals. For instance, each retaining wall 84 may include a framed metal structure on which a plurality of wood planks is disposed along the framed metal structure.

The plurality of retaining walls 84 is positioned and secured along outer edges of the platform 82 and, in particular, along a top planar surface thereof. In the shown embodiment, the pair of side retaining walls 86 are positioned along opposite longitudinal sides of the platform 82, while the retaining end wall 88 is positioned at trailing end of the platform 82. Each retaining wall 84 extends substantially perpendicular with respect to the top planar surface of the platform 82. Each retaining wall 84 is mechanically secured to the platform 82, for instance, using a weld or plurality of known mechanical fasteners. In addition, the retaining end wall 88 is secured to a pair of common ends of the side retaining walls 86. In the embodiment shown, the retaining end wall 88 is mechanically secured to the pair of side retaining walls 86, for instance, using a weld or other known mechanical fasteners or adhesives.

As shown, the tailgate 90 is positioned along a leading end of the platform 82, opposite the retaining end wall 88 positioned along the trailing end thereof. In the embodiment shown, the tailgate 90 is made of a metal. However, one skilled in the art should appreciate that the tailgate 90 could be manufactured using other materials, such as lumber, composite, and other metals. For instance, tailgate 90 may include a framed metal structure on which a plurality of wood planks is disposed along the framed metal structure.

As shown, the tailgate 90 is positioned along an outer edge of the platform 82 and extends substantially perpendicular to the top planar surface thereof. The tailgate 90 is secured to the platform 82, for instance, through a rotating fastener device, such as a rotating hinge 92 positioned at bottom of the tailgate 90 and connecting to the platform 82. The rotating hinge 92 permits rotation of the tailgate 90 from a secured closed vertical position to one in which the tailgate 90 rotates away from the retaining end wall 88 making the platform 82 accessible. However, one skilled in the art should appreciate that other design are possible. For instance, the tailgate 90 may be pivotably mounted to side retaining walls 86 such that the tailgate 90 pivots away from the outer edge of the platform 82 or from the side retaining walls 86, much like known dump trucks.

Each cover section 94 is a rectangular metal structure having a planar surface. Each cover section 94 is positioned along and connected to upper outer edges of the pair of side retaining walls 86 using a plurality of hinges 96. However, one skilled in the art should appreciate that other designs are possible. For instance, other known rotating mechanisms could be used. Each cover section 94 measures approximately half a width as measured between the pair of side retaining walls 86.

A pair of stops 98 are provided and positioned along a common side at opposite ends of the cover section 94. In particular, each stop 98 is disposed along an outer edge of the cover section 94 that is proximate to the side retaining wall 86 when assembled. Each stop 98 is a metal plate having one end secured to the cover section 94. In an exemplary embodiment, the stop 98 is semi-circle shaped having a free end configured to abut the side retaining wall 86 when the cover section 94 rotates about the hinge 96. The stop 98 configuration determines that angle at which the cover section 94 is positioned in an open position. For instance, if the stop 98 has a 135 degree semi-circle shape, then the cover section 94 will be positioned at a 45 degree angle with respect to a plane extending across top surfaces of both side retaining walls 86.

In the shown embodiment, a plurality of wall supports 99 are provided and disposed along outer surfaces of the platform 82, the retaining walls 84, the tailgate 90, and the cover sections 94. The wall supports 99 provide reinforcement for the planar surfaces of each of the outer surfaces. In the shown embodiment, each wall support 89 is a tubular structure of metal that is mechanically secured to the outer surfaces, for instance, using a weld. However, one skilled in the art should appreciate that other known fastening means are possible, including but not limited to screws, nuts and bolts, and adhesives.

Now with references to FIGS. 4-6 and 8, the extension device 100 according to the invention will be described. As shown, the extension device 100 includes the following major components: a first extension section 102, a second extension section 120, and a storage bin platform section 180.

As shown, the first extension section 102 is shown and generally includes a pair of lower supports 104 reciprocally connected to the support beams 12 and a lower lifting actuator assembly 106 connected to the front support 16.

Each lower support 104 is an elongated structural support and, in the shown embodiment, a metal plate. Each lower support 104 includes a plurality of fastener receiving through-holes 108 positioned at a trailing end, leading end, and a middle section thereof. The pair of lower supports 104 are positioned parallel, and are rotatably secured to the frame 10 using fasteners. The lower lifting actuator assembly 106 includes a pair of hydraulic actuators connecting to the front support 16 at one end and to the middle section of the lower support 104 at another end thereof using fasteners.

As shown, the second extension section 120 is shown and includes a boom support 122, a sliding support 124, a sliding mechanism 130, an upper lifting actuator assembly 140, and an articulating arm assembly 150.

The boom support 122 is elongated structural beams and, in the shown embodiment, a tubular metal beam. The boom support 122 includes a pair of fastener receiving brackets 123 with through holes positioned at a trailing end thereof and extending completely there through.

As shown, each sliding support 124 is an elongated structural beams having a boom support receiving passageway 126 opening from a trailing end thereof and extending there through a body of sliding support 124. The boom support receiving passageway 126 is shaped to receive the boom support 122 and, as shown, a cross section area of the boom support receiving passageway 126 is larger than a cross section area of the boom support 122. As a result, a leading end of the boom support 122 is positioned through the boom support receiving passageway 126.

In the shown embodiment, each sliding support 124 is a tubular metal beam. Each sliding support 124 includes a fastener receiving through-hole 128 positioned at a leading end thereof and extending completely there through.

The sliding mechanism 130 is positioned between and connected to the boom support 122 and the boom support receiving passageway 126.

Each sliding mechanism 130 includes an actuator section 132 which may be a known hydraulic cylinder having a barrel, a piston, piston rod, seals, and seal glands. However, one skilled in the art should appreciate that other actuator systems operated by a source of energy, such as electric current, hydraulic fluid pressure, or pneumatic pressure.

In the shown embodiment, the upper lifting actuator assembly 140 includes a pair of hydraulic actuators 142 is positioned between frame 10 and the second extension section 120. Each hydraulic actuators 142 includes an actuator 174 which may be a known hydraulic cylinder having a barrel, a piston, piston rod, seals, and seal glands. However, one skilled in the art should appreciate that other actuator systems operated by a source of energy, such as electric current, hydraulic fluid pressure, or pneumatic pressure.

As shown, in an exemplary embodiment of the invention, the articulating arm assembly 150 is a pair of plate like members (see FIG. 8) rotatably connected to the sliding support 124 and the storage bin 180 using the storage bin platform section. It is also contemplated that the articulating arm may actuate to lift or otherwise move any useful item, and is not limited to containers as described herein, but rather, may include, pallet forks, temporary lighting fixtures, cherry picker buckets, and may feature a receiver for mounting a variety of accessories or implements.

As shown, the storage bin platform section 180 is shown and generally includes a platform 182, a platform cross member 184, a tilting actuator cross member (not shown), and a pair of bin tilting actuators (not shown).

Now with reference to FIGS. 1, 10, and 11, operation of the trailer 1 according to the invention will be described.

Building materials can be loaded and secured in the storage bin 80 at a location different than the work site. A truck (not shown) connects to the frame 10 using the trailer hitch 22. The operator positioned the front wheel assembly 340 apart from the rear wheel assembly 310 using the extension assembly 380. The front wheel assembly 340 and the rear wheel assembly 310 are set to drive and steer using the control system 60. The trailer 1 then can operate as a standard trailer and be towed behind the connected truck to the work site.

The operator then uses the control system 60 to move the trailer 1 to a desired location on the work site using the drive system of the front wheel assembly 340 and the rear wheel assembly 310, as described above. The operator may now use the control system 60 to stabilize the trailer 1.

Once the operator has determined that the trailer 1 is in position to unload building materials from the storage bin 80, the operator can manage the stabilizers (not shown) to stabilize and level the trailer 1. The operator then uses the control system 60 to control the extension device 100 and position of the storage bin 80.

The operator can use the control system 60 to control the vertical and horizontal position of the storage bin 80. In addition, the operator can slide the storage bin 80 horizontally with respect to frame 10.

The foregoing illustrates some of the possibilities for practicing the invention. Many other embodiments and fields of use for the trailer 1 are possible and within the scope and spirit of the invention. It is, therefore, intended that the foregoing description be regarded as illustrative rather than limiting.

What is claimed is:

1. A trailer for towing behind a power vehicle, comprising:
 a frame forming an undercarriage chassis, the frame includes a support rail, a plurality of support beams, connection beams, front support, and rear support to form the undercarriage chassis; and
 a self-propelled tandem wheel assembly driven by an onboard source of motor power positioned under the undercarriage chassis and having a rear wheel assembly and a front wheel assembly, the rear wheel assembly includes a pair of rear wheels, a rear wheel frame, a rear steering assembly, and a rear drive assembly and the rear wheel assembly and the front wheel assembly are equally positioned to support the undercarriage chassis.

2. The trailer for towing behind the power vehicle of claim 1, wherein the front wheel assembly includes a pair of front wheels, a front wheel frame, a front steering assembly, and a front drive assembly.

3. The trailer for towing behind the power vehicle of claim 2, wherein the self-propelled tandem wheel assembly further includes an extension assembly.

4. The trailer for towing behind the power vehicle of claim 3, wherein the extension assembly includes a rear end connector, a moveable axle connector, and a moving component.

5. The trailer for towing behind the power vehicle of claim 4, wherein the front wheel assembly is positioned apart from the rear wheel assembly using the extension assembly.

6. The trailer for towing behind the power vehicle of claim 5, wherein the trailer further comprises a control system.

7. The trailer for towing behind the power vehicle of claim 6, wherein the control system expands and retract the front wheel assembly.

8. The trailer for towing behind the power vehicle of claim 7, wherein the rear wheel assembly and the front wheel assembly are positioned to fully support the undercarriage chassis.

9. The trailer for towing behind the power vehicle of claim 8, wherein the extension assembly moving the front wheel assembly along a longitudinal axis of the chassis.

10. The trailer for towing behind the power vehicle of claim 1, wherein the frame disengaging from the power vehicle and operating self-propelled.

11. A trailer for towing behind a power vehicle, comprising:
a towable frame forming an undercarriage chassis having a support rail positioned on a lower end and running along a length, the towable frame is further secured by a front support and a rear support, the towable frame has a plurality of support beams positioned and secured apart by a plurality of connecting beams; and
a control system; and
a storage bin; and
an extension device; and
a self-driven tandem wheel assembly driven by an onboard source of motor power positioned under the undercarriage chassis and having a rear wheel assembly, the rear wheel assembly includes a steering capability using a rear steering assembly, a front wheel assembly, and an extension assembly moving the front wheel assembly.

12. The trailer for towing behind the power vehicle of claim 11, wherein the front wheel assembly includes a steering capability using a front steering assembly.

13. The trailer for towing behind the power vehicle of claim 12, wherein the extension assembly includes a rear end connector, a moveable axle connector, and a moving component.

14. The trailer for towing behind the power vehicle of claim 13, wherein the rear end connector is connected to the rear wheel assembly, while the moveable axle connector is connected to the front wheel assembly.

* * * * *